United States Patent [19]

Yamaguchi et al.

[11] 4,396,587

[45] Aug. 2, 1983

[54] METHOD FOR MANUFACTURE OF SILICON NITRIDE

[75] Inventors: Masami Yamaguchi, Tokorozawa; Yoshirou Tajitsu; Yoshiharu Kitahama, both of Kawasaki; Isamu Iwami, Zushi, all of Japan

[73] Assignee: Asahi-Dow Limited, Tokyo, Japan

[21] Appl. No.: 294,027

[22] Filed: Aug. 18, 1981

[30] Foreign Application Priority Data

| Aug. 29, 1980 | [JP] | Japan | 55-118463 |
| Aug. 29, 1980 | [JP] | Japan | 55-118464 |
| Nov. 12, 1980 | [JP] | Japan | 55-158144 |
| Nov. 13, 1980 | [JP] | Japan | 55-159855 |
| Nov. 14, 1980 | [JP] | Japan | 55-159430 |

[51] Int. Cl.$^3$ ............................................. C01B 21/068
[52] U.S. Cl. ................................... 423/344; 423/406
[58] Field of Search ..................... 423/344, 345, 406; 501/154

[56] References Cited

U.S. PATENT DOCUMENTS

| 3,085,863 | 4/1963 | Prener | 423/345 |
| 3,379,647 | 4/1968 | Smudski | 423/345 X |
| 3,399,979 | 9/1968 | Hamling | 423/344 |
| 4,117,095 | 9/1978 | Komeya et al. | |
| 4,122,152 | 10/1978 | Mori et al. | |
| 4,264,565 | 4/1981 | Inoue et al. | 423/344 |

FOREIGN PATENT DOCUMENTS 1565919  5/1969  France ........................ 423/345

Primary Examiner—Jack Cooper
Attorney, Agent, or Firm—Armstrong, Nikaido, Marmelstein & Kubovcik

[57] ABSTRACT

Silicon nitride of improved quality is obtained by using a liquid silicic acid or modified liquid silicic acid as a silicic substance and carbon in a powdered form, a precursor of carbon in a powdered form, or a precursor of carbon in the form of a solution as a carbonaceous substance, and thermally treating these raw materials in a non-oxidative atmosphere containing nitrogen. By this method, α-type silicon nitride can be easily obtained. Particularly, finely divided α-type silicon nitride suitable for use as the raw material for the production of high-strength sintered articles is also produced. α-type silicon nitride whiskers useful as a reinforcing material for ceramic and metallic articles is also obtained.

14 Claims, 2 Drawing Figures

10μ

10μ

METHOD FOR MANUFACTURE OF SILICON NITRIDE

BACKGROUND OF THE INVENTION

This invention relates to a method for the manufacture of α-type silicon nitride, and more particularly to a method for the manufacture of finely divided α-type silicon nitride suitable for use as a raw material for the production of high-strength sintered articles of α-type silicon nitride.

Silicon nitride has excellent thermal resistance and high-temperature strength. Silicon nitride in a sintered form, therefore, is expected to find utility in various high-temperature structural members such as high-temperature gas turbines, for example. The thermal and mechanical properties of the sintered articles of silicon nitride depend heavily on the attributes of silicon nitride, the raw material for the sintered articles. To achieve the optimum effect, silicon nitride is desired to have as high an α-type content and possess as small a particle diameter as possible. Among the methods developed and adopted to date for the synthesis of silicon nitride, those widely known in the art are:
(i) nitridation of metallic silicon,
(ii) reaction of silicon tetrachloride and ammonia,
(iii) reductive nitridation of silica ($SiO_2$) powder by heating the silica powder with carbon powder in a nitrogen atmosphere.

Of these methods, the method (iii) enjoys a number of commercial advantages such as low cost of raw materials used, simplicity and ease of reactions and attendant operations involved in the synthesis, and freedom from use of raw materials capable of corroding the equipment in use.

In the method (iii), however, the nitriding of silica powder does not easily proceed and, in particular, the nitriding of crystalline silica proceeds with great difficulty. Thus, this method is generally carried out using amorphous silica powder. Even when amorphous silica powder of relatively high reactivity is adopted, this method has necessitated adoption of special measures for further enhancing the powder's reactivity. For example, the method of Japanese Patent Publication No. 12320/1976 relies on use of amorphous silica powder having a fluoride or silicofluoride adhered thereto. This method is not very advantageous, however, because addition of a fluoride, etc. results in a fall in the purity of the silicon nitride product.

Further, the product of the method (iii) is generally a mixture of α-type silicon nitride, β-type silicon nitride, silicon carbide, etc. and occasionally including unaltered silica and silicon oxy-nitride. Thus, the product is apt to contain only a small proportion of the desired α-type silicon nitride.

A number of methods have been proposed to date with a view to overcoming these drawbacks and obtaining products of a high α-type silicon nitride content by the method (iii) which promises many commercial advantages. For example, the method of U.S. Pat. No. 4,117,095 contemplates addition of metallic silicon, that of Japanese Patent Publication No. 23917/1979 addition of silicon nitride, silicon carbide, etc. and that of Japanese Unexamined Patent Publication No. 126696/1979 addition of silicon nitrogen imide respectively as third components to the reaction system of the method (iii), and the method of U.S. Pat. No. 4,122,152 involves use of special carbon powder. The methods which resort to addition of third components are not desirable approaches from the economic point of view because the third components specified for addition are more expensive than the main raw materials silica and carbon. The undesirability of these approaches is aggravated by the special requirements imposed on the attributes of such third components themselves such as, for example, the requirement in the method of U.S. Pat. No. 4,117,095 for use of metallic silicon having an average particle diameter of not more than 10μ. The method resorting to use of a special carbon powder has a disadvantage that the individual particles of the silicon nitride powder product lack uniformity of shape and have larger diameters than are expected.

In addition to the aforementioned methods available for the synthesis of silicon nitride, the method disclosed by Japanese Unexamined Patent Publication No. 138898/1979 has found wide recognition in the art. This method comprises preparing a mixture of a silicon compound represented by the formula:

$$SiR^1(R^2)_3$$

(wherein $R^1$ is an alkyl group having 1 to 4 carbon atoms and $R^2$ is a hydrogen atom or a chloride atom), a silicon compound represented by the formula:

$$Si(R^3)_4$$

(wherein $R^3$ is a hydrogen atom, a chlorine atom, or an alkoxy group having 1 to 4 carbon atoms), and carbon powder. Adjusting the mixture to a pH value of not more than 12, produces a precipitate of carbon particles having adsorbed on their surface a silicon compound represented by the formula:

$$(R^4)_{2x2}Si_2O_{4-x2}\cdot yH_2O$$

(wherein $R^4$ is an alkyl group having 1 to 4 carbon atoms, $x_2$ is an integer having a value of not more than 3, and y denotes the amount of water of adsorption). This precipitate is then nitrided. This method has a disadvantage that it requires use of expensive raw materials and necessitates thermal treatments in two separate stages.

Japanese Unexamined Patent Publication No. 25500/1976 teaches a method which uses, as the raw material for nitriding, a product obtained by impregnating an organic polymer with a solution containing silicon and thermally decomposing the impregnated organic polymer into ashes. The specification of this patent application offers no specific description concerning "the solution containing silicon" and discloses no specific technical measures. Accordingly the disclosure of this specification seems to be entirely speculative.

SUMMARY OF THE INVENTION

An object of this invention is to provide a method for easy manufacture of α-type silicon nitride, and more particularly a novel method for the manufacture of finely divided α-type silicon nitride suitable for use as a raw material for the production of high-strength sintered articles of silicon nitride.

Another object of this invention is to provide a novel method for producing fine α-type silicon nitride whiskers promissing to serve as a useful reinforcing material for ceramic and metallic articles.

This invention relates to an improved method for the manufacture of silicon nitride by the thermal treatment of a silicic substance and a carbonaceous substance in a nonoxidative atmosphere containing nitrogen. The improvement comprises using as the silicic substance either liquid silicic acid or modified liquid silicic acid and as the carbonaceous substance carbon in a powdered form, a precursor of carbon in a powdered form, or a precursor of carbon in the form of a solution.

DETAILED DESCRIPTION OF THE INVENTION

Figure 1:
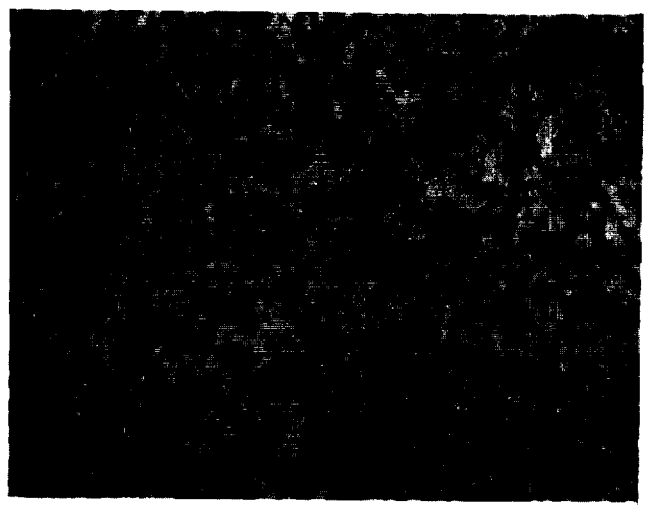
FIG. 1 is an electron microscope photomicrograph of finely divided silicon nitride obtained by one embodiment (Example 5) of the production method according to the present invention.

This invention has originated in the discovery that in the method (iii) which produces silicon nitride by heating a nitriding raw material containing a carbonaceous substance and a silicic substance in a non-oxidative atmosphere containing nitrogen, α-type silicon nitride having a small particle diameter is readily produced when silicic acid in a liquid form is used as the silicic substance in the place of solid silica which has long been used for this purpose.

This good effect of the present invention may be possibly ascribable to the fact that whereas the conventional method has used a mixture of a solid silica and a solid carbon, this invention uses a liquid silicic acid and, as the result, the carbonaceous substance and the silicic substance are brought into uniform and intimate contact with each other.

Now, the present invention will be described in detail below. The term "silicic acid" as used in this specification means $Si(OH)_4$ or a dehydration condensation product thereof. Silicic acid can be easily prepared by any of various methods known to the art. For example, it is readily produced by a method which uses an alkali silicate as the raw material and dealkalizes this compound by subjecting an aqueous solution of the compound to acidolysis, electrolytic dialysis, or iron exchange. Another method uses a hydrolyzable silicon compound such as a silicon halogenide or a silicic ester, for example ethyl silicate as the raw material and subjects this raw material to hydrolysis. The method which uses an alkali silicate as the raw material, among other methods, proves to be advantageous from the economic point of view.

The term "liquid silicic acid" as used in this specification means a solution and/or sol of silicic acid as defined above. Although water is generally used as the solvent or dispersant in the liquid silicic acid, an organic solvent or a mixture of an organic solvent with water may be used instead. A solvent or dispersant suitable for a particular occasion is selected taking into due account the type of the raw material for silicic acid and the method used for the production of silicic acid. For example, water is preferable when the silicic acid has been produced by the dealkalization of an alkali silicate by use of an ion-exchange resin, whereas a water-organic solvent system is preferable when the silicic acid has been obtained by the hydrolysis of a silicic ester. The organic solvent is desired to be a polar organic solvent which exhibits high miscibility to silicic acid. Examples of organic solvents which meet this requirement include alcohols, ketones, esters, organic acids, halogenated hydrocarbons, amides, and sulfoxides. Other organic solvents may be tolerated, providing that they do not cause precipitation of silicic acid.

In the liquid silicic acid, silicic acid may be in a dissolved state or in a colloidal state as a sol. When the silicic acid is in the state of sol, the smaller the diameters of the colloidal particles of the sol are, the better the result is. In the present invention, the diameters of the individual colloidal particles of the sol are generally to be less than 40 mμ, preferably less than 20 mμ, and more preferably less than 10 mμ. Besides, the so-called colloidal silica in which the particles have been grown to an average diameter of the order of some tens of mμ and have been subjected to a stabilizing treatment can be used as a liquid silicic acid in this invention. A colloidal silica which has used a nonvolatile stabilizer is undesirable for the purpose of this invention, because this stabilizer persists in the final product.

The term "modified liquid silicic acid" as used in this specification means a solution of silicic acid or a sol containing at least one member selected from the group consisting of ammonium ion, organic amine, and quaternary ammonium ion. The modified liquid silicic acid exhibits high stability and yields to gelation with greater resistance than the liquid silicic acid and, therefore, enjoys an advantage that it can be handled and stored with ease. The modified liquid silicic acid to be used in this invention can be easily produced by any of various methods known in the art. Among these methods, the method which involves treatment of the aqueous solution of an alkali silicate with an ion-exchange resin incorporating ammonium ion, organic amine, or quaternary ammonium ion proves to be particularly advantageous from the commercial point of view. In the liquid silicic acid or modified liquid silicic acid, the concentration of silicic acid calculated as $SiO_2$ is generally not more than 50%, preferably not more than 20%, and more preferably not more than 15%. When the concentration is higher, the liquid silicic acid tends to undergo gelation. Once the liquid silicic acid forms a gel, it can no longer uniformly contact the carbonaceous substance. Although the lower limit of the concentration of silicic acid is determined by reason of economy it is generally to be not less than 0.5% by weight, preferably not less than 1% by weight, and more preferably not less than 4% by weight. From the economic point of view, the amount of the modifying agent such as ammonium ion to be contained in the modified liquid silicic acid is generally to be not more than 4 mols, preferably not more than 2 mols, per mol of Si in the silicic acid. If the modifying agent is present in a greater amount, however, no technical difficulty is entailed.

As the carbonaceous substance, there can be used carbon in a powdered form, a precursor of carbon in a powdered form, or a precursor of carbon in the form of a solution. By combining such a carbonaceous substance and the liquid silicic acid or modified liquid silicic acid, α-type silicon nitride of high grade of quality can be easily produced.

Examples of carbon in a powdered form are carbon black and activated carbon. In the conventional method, finely divided carbon black has been exclusively used because this method involves use of a mixture of a carbonaceous substance with solid silica and, therefore, necessitates intimate contact between the two substances. The method of this invention tolerates use of activated carbon which consists of coarse carbon particles, because the liquid silicic acid used as a silicic substance ensures uniform, intimate contact with the carbonaceous substance. The method of this invention, consequently, produces silicon nitride of a small particle diameter, probably because the liquid silicic acid is capable of penetrating into the micropores of the activated carbon particles.

The term "precursor of carbon" as used in this specification means a substance which produces carbon at elevated temperatures, namely, an organic substance which converts into a carbonaceous residue when it is heated to a temperature falling within the range of from 200° to 1500° C. at least in a nonoxidative atmosphere. Such a precursor of carbon can be suitably selected from among carbohydrates and their derivatives. Concrete examples of carbohydrates and their derivatives include polysaccharides such as starch, cellulose, hemicellulose, hydroxyethyl cellulose, alginic acid, pectin, natural gum, dextrin, and dextran, derivatives thereof, and hydrolyzates thereof, oligosaccharides and monosaccharides such as sucrose, maltose, and glucose, and derivatives thereof. Other examples of precursors of carbon include proteinaceous substances such as gluten and casein and derivatives thereof, vinyl polymers such as polyvinyl alcohol, polyacrylonitrile, polyvinyl chloride, polyvinylidene chloride, polyvinyl acetate, polybutadiene, and copolymers preponderantly formed thereof, and derivatives of of vinyl polymers, thermosetting resins such as phenol resin and urea resin, petroleum pitch, and many others.

The precursor of carbon is generally required to be in the form of a powder or a solution. Use of a precursor of carbon in the form of a solution provides particularly desirable because of the precursor solution ensures uniform, intimate mixture with the liquid silicic acid. Use of a precursor of carbon in the form of a fabric or film does not prove very favorable because the produced silicon nitride tends to assume the form of a fabric or film.

The term "precursor of carbon in the form of a solution" as used in this specification means a precursor of carbon in the form of a solution or sol in which the precursor of carbon exists as a solute or dispersoid. The precursor of carbon which proves particularly suitable for the purpose of this invention, therefore, is a precursor of carbon which is readily converted into a solution or sol. Examples of particularly suitable precursors of carbon include monosaccharides, oligosaccharides, polysaccharides, vinyl polymers, and derivatives thereof. Among the precursors of carbon enumerated above, carbohydrates, particularly starch, and hydrolyzates thereof are especially advantageous because they are inexpensive and show high degrees of affinity for water, a common solvent for the liquid silicic acid.

The effective concentration of the precursor of carbon in its solution covers a wide range. At a high concentration, however, the precursor assumes too high viscosity to permit ready handling. At a low concentration, the precursor does not prove economical as a raw material. Thus, the concentration of the precursor is generally required to fall in the range of from 0.1 to 80% by weight, preferably from 0.5 to 60% by weight, and more preferably from 1 to 50% by weight.

The solvent or dispersant to be used in the precursor of carbon in the form of a solution is only required to suit the particular precursor of carbon involved. Preferably, the solvent or dispersant possesses high affinity for the silicic acid. Examples are water and polar organic solvents such as alcohols, ketones, esters, organic acids, amides, and sulfoxides. Among the solvents, water is a preferred choice.

The ratio of the carbon or precursor of carbon to the liquid silicic acid or modified liquid silicic acid is generally to fall in the range of from 0.3 to 5 parts by weight, preferably from 0.4 to 2 parts by weight, of the carbon or the carbon content of the precursor of carbon per 1 part of weight of the silicic acid content, calculated as $SiO_2$, of the liquid silicic acid or modified liquid silicic acid. When the content of C is smaller than the lower limit of the range mentioned above, the produced silicon nitride has a tendency to contain unaltered $SiO_2$ and silicon oxy-nitride as impurities. When the content of C is larger than the upper limit of the range, the economy of the production is impaired, although no technical inconvenience is entailed.

The carbonaceous substance and the liquid silicic acid or modified liquid silicic acid are used in the respective amounts which satisfy the ratio specified above. The desired intimate contact between these two substances can be obtained by any of various measures such as immersion, impregnation, spraying, coating, kneading, and mixing. More specifically, it may be accomplished by preparing the carbon or precursor of carbon in a fluid state and spraying the liquid silicic acid onto the fluid carbon or by adding the carbon or precursor of carbon in a powdered form to the liquid silicic acid and stirring the mixture with a high speed mixer. Otherwise, the intimate contact may be effected by mixing the liquid silicic acid with the solution or sol of the precursor of carbon or by adding the precursor of carbon to the liquid silicic acid and allowing the former substance to dissolve intimately in the latter liquid. What is important here is that the carbon or precursor of carbon and the liquid silicic acid or modified liquid silicic acid should be brought into a uniformly mixed state. In this case, it suffices for the purpose of this invention that the two raw materials are homogeneously mixed with each other. This mixing does not need to produce any chemical reaction at this stage. However, any chemical reaction taking place may be tolerated providing that this chemical reaction does not impair the uniformity of the system. Once the two substances have been brought into a homogeneously mixed liquid state, it does not matter at all whether the entire system undergoes gelation or not.

The mixed system of the two substances may incorporate a third component capable of accelerating reaction, improving the product quality, or enhancing the sintering property, on condition that the added third component will not impair the homogeneity of the mixed system. For example, a surface active agent may be added to the system for the purpose of ensuring smooth mixing of the two substances. Addition of urea has been ascertained to aid in fine division of the produced silicon nitride and consequent uniformization of the particle diameter distribution.

The mixture thus obtained is subjected to a reductive nitriding treatment after undergoing, or not undergoing, a pretreatment for drying or solidification. Since the reductive nitriding reaction proceeds at elevated temperatures, a mixture which has a low water content can be subjected directly to this reaction without undergoing the treatment for drying in advance. When the mixture has to go through a pretreatment for drying, any of various methods of drying of popular use can be adopted. Examples are drying in air, drying by heat application, drying in hot air, drying under a vacuum, drying by spraying, and drying by freezing. The drying is desired to proceed uniformly throughout. Spray drying proves particularly desirable, because the mixture is uniformly dried so that the produced silicon nitride has a very small particle diameter. The advantageous effect of spray drying is especially conspicuous when the mixture has been produced by using a precursor of carbon in the form of a solution. When soluble starch has been used as a precursor of carbon, for example, the particle diameter of the product may be less than $0.4\mu$.

It has been found that when the mixture is freeze dried, the silicon nitride product preponderantly assumes the shape of whiskers. This is an interesting feature of the present invention. These whiskers generally measure 0.3 to $2\mu$ in diameter and 30 to $1000\mu$ in length.

When freeze drying is effected on a mixture which has been produced by using finely divided silica powder in the place of the liquid silicic acid contemplated by this invention, the produced silicon nitride does not assume a preponderantly whisker form as may be obtained by this invention. The liquid silicic acid, on being freeze dried, adopts a special surface behavior and texture. This fact is believed to be closely connected to the effect of the present invention, but the mechanism by which the silicon nitride produced by the method of this invention assumes such as preponderantly whisker form remains yet to be found. The freeze drying can be carried out by apparatus and method which are generally adopted for the purpose of freeze drying. No special apparatus or techniques are required.

In another embodiment, the carbon or precursor of carbon and the liquid silicic acid or modified liquid silicic acid may be mixed uniformly, the mixture treated so as to solidify and precipitate the silicic acid or modified silicic acid therein, and the resulting mixture containing the precipitated silicic acid or modified silicic acid subjected to the reductive nitriding reaction.

Particularly, finely divided $\alpha$-type silicon nitride can be obtained by uniformly mixing a precursor of carbon in the form of a solution with the liquid silicic acid or modified liquid silicic acid and then treating the resultant mixture so as to solidify and precipitate the two components of the mixture at the same time. The finely divided silicon nitride thus produced generally has a particle diameter of the order of 0.2 to $0.4\mu$, for example.

The solidification and precipitation can be carried out by any of various methods generally available for the purpose of solidification and precipitation.

For example, in the case of ammonium alginate/$NH_4$-modified liquid silicic acid, the solidification can be accomplished by adding the mixture to an acidic solidification bath or to an organic solvent such as n-butanol. In the presence of carbon or a precursor of carbon in a powdered form, the silicic acid or modified silicic acid can be precipitated by such a method as contact with $CO_2$ gas or cationic polymers, or pH adjustment in the presence of surfactant, etc. Where polyvinyl alcohol has been used as a precursor of carbon, the solidification can be effected by using a coagulation bath generally adopted in the extrusion of polyvinyl alcohol filaments, with any necessary modification. In any event, desired solidification and precipitation can be accomplished by the solidification method suitable for the raw materials used in the mixture.

The reductive nitriding reaction can be carried out by a conventional method. It proceeds advantageously when the mixture is heated in a non-oxidative atmosphere containing nitrogen to a temperature in the range of from 1300° to 1600° C., preferably from 1350° to 1550° C. The nitrogen in the atmosphere may be substituted with ammonia. Either of the gases may be used in conjunction with hydrogen or an inert gas such as helium, argon or neon in the atmosphere. Use of nitrogen alone, however, proves to be most practical. At a temperature below 1300° C., the reaction proceeds with difficulty. At a temperature above 1600° C., the reaction by-produces a small amount of silicon carbide. The advantages of the present invention are enumerated below.

The conventional method which starts with powdered silica and powdered carbon involves a solid-phase mixture. Consequently, the two substances are mixed with insufficient uniformity and the reaction proceeds ununiformly. Not infrequently, therefore, persistence of unaltered raw materials, occurrence of by-products, and ununiformity of the crystalline phase have been observed. In contrast, the method of the present invention which uses a liquid-phase mixture is capable of keeping the raw materials in a uniformly mixed form. The method of this invention is not so susceptible to such adverse phenomena and can produce silicon nitride of uniform quality having a high $\alpha$-type crystal content. The silicon nitride which is produced by the method of this invention generally has an $\alpha$-type crystal content of at least 80%, and usually more than 90%. Moreover, the individual particles of the produced silicon nitride have a small particle diameter. The particle diameter is usually at most $1.5\mu$ when carbon in a powdered form has been used in the mixture. The particle diameter is particularly small and generally reaches the level of less than $0.4\mu$ when a precursor of carbon in the form of a solution has been used in the mixture and the mixture has been spray dried or subjected to solidification and precipitation.

Another advantage of this metod is ascribable to use of starting materials which are not solid but liquid. If the raw materials happen to contain detrimental impurities, removal of such impurities can be easily effected by means of filtration or by a treatment with an ion-exchange resin. Thus, the silicon nitride produced eventually enjoys high purity.

Yet another advantage of this invention resides in its capability of producing $\alpha$-type silicon nitride crystals in the form of whiskers by bringing the carbonaceous substance and the liquid silicic acid or modified liquid silicic acid into intimate contact, then freeze drying the resultant mixture, and subjecting the dried mixture to a nitriding reaction.

This invention will now be illustrated by reference to the following working examples. In the examples below, the proportion of the $\alpha$-type crystal contained in the silicon nitride product was determined by measuring the intensities (I) of the (102) and (210) diffraction lines of $\alpha$-type silicon nitride and those of the (101) and (210) diffraction lines of $\beta$-type silicon nitride from the X-ray diffraction (Cu-$K_\alpha$, $2\theta$) pattern and applying the found values to the following equation.

$$\text{Proportion of } \alpha\text{-type crystal (\%)} = \frac{I_\alpha(102) + I_\alpha(210)}{I_\alpha(102) + I_\alpha(210) + I_\beta(101) + I_\beta(210)} \times 100$$

EXAMPLE 1

Sixty (60) g of a dilute aqueous solution (concentration: 8% by weight as $SiO_2$) of water glass No. 3 (JIS K1408-66) was passed at a flow rate of 4.5 ml/min through a column (glass column measuring 1 cm in diameter and 90 cm in length and provided with a cooling jacket) packed with 60 ml of a cation-exchange resin, "Amberlite" 200-C ($H^+$ form), for the removal of sodium ("Amberlite" is a Registered Trade Mark). Consequently, an aqueous silicic acid solution (concentration: 5% by weight as $SiO_2$) was obtained. 90 g of the aqueous silicic acid solution produced as described above with 2 g of carbon black added thereto were treated in a homogenizer for 15 minutes. The homogenization product was spray dried to give a silicic acid-carbon black mixture. This mixture was heated at 1510° C. for four hours in an atmosphere of nitrogen, to produce silicon nitride. No silicon carbide or silicon oxy-nitride by-products were observed. The proportion of $\alpha$-type crystals contained in the silicon nitride was 96%. The silicon nitride powder had an average particle diameter of 1.2$\mu$.

COMPARATIVE EXPERIMENT 1

The procedure of Example 1 was repeated, except that a suspension obtained by suspending 4.5 g of silica powder ("Wako-Gel" Q-22 produced by Wako Junyaku) in 90 ml of water was used in the place of 90 g of the aqueous silicic acid solution ("Wako-Gel" is a Registered Trade Mark). In the product obtained, silicon carbide and $SiO_2$ were present in addition to silicon nitride. The silicon nitride powder had a large particle diameter in the range of from 5 to 10$\mu$. The proportion of $\alpha$-type crystals in the product was about 65%.

EXAMPLE 2

Eight (8) g of activated carbon was impregnated with 20 g of the same aqueous silicic acid solution as used in Example 1 and the wet activated carbon was vacuum dried at 60° C. The dried activated carbon was again impregnated with 20 g of the same aqueous silicic acid solution and similarly dried. By repeating this procedure, the activated carbon was treated with a total of 100 g of the aqueous silicic acid solution, to give a silicic acid-activated carbon mixture. This mixture was subjected to the nitriding reaction under the same conditions as involved in Example 1, to produce silicon nitride. No silicon carbide and silicon oxy-nitride by-products were observed. The silicon nitride powder had an average particle diameter of 0.7$\mu$. The proportion of $\alpha$-type crystals in the product was 90%.

COMPARATIVE EXPERIMENT 2

The procedure of Example 2 was repeated, except that a suspension obtained by suspending 5 g of ultrafine silica powder ("Aerosil" #200, particle diameter 12 m$\mu$) in 100 ml of water was used in the place of the aqueous silicic acid solution ("Aerosil" is a Registered Trade Mark).

The proportion of $\alpha$-type crystals contained in the silicon nitride was 77%. The silicon nitride powder had an average particle diameter of 3$\mu$. Although no silicon carbide by-product was observed, the presence of $SiO_2$ was detected.

EXAMPLE 3

A clear solution of glucose was obtained by stirring 2 g of glucose in 20 g of the same aqueous silicic acid solution as used in Example 1 until the glucose was thoroughly dissolved. The solution was concentrated in a rotary evaporator and the concentrate was heated at 1510° C. for four hours in an atmosphere of nitrogen, to give silicon nitride. The proportion of $\alpha$-type crystals in the product was 93%. The silicon nitride powder had an average particle diameter of 0.5$\mu$. No silicon carbide and silicon oxy-nitride by-products were observed.

COMPARATIVE EXPERIMENT 3

The procedure of Example 3 was repeated, except that a liquid obtained by suspending 1 g of silica powder in 20 ml of water was used in the place of the aqueous silicic acid solution. No silicon carbide and silicon oxy-nitride by-products were observed. The proportion of $\alpha$-type crystals contained in the product was 75%. The silicon nitride powder had an average particle diameter of 0.9$\mu$. The presence of unaltered silica was observed in the product.

EXAMPLE 4

An aqueous solution containing sucrose and sodium metasilicate (concentrations: 10% by weight of sucrose and 5% by weight of $SiO_2$) was passed through a column of a cation-exchange resin, "Amberlite" 200-C ($H^+$ form), for the removal of sodium. Consequently, there was obtained an aqueous silicic acid-sucrose solution (concentrations: 9% by weight of sucrose and 4.5% by weight of $SiO_2$). When 20 g of this solution was spray dried and then heated at 1480° C. for eight hours in an atmosphere of nitrogen, there was produced silicon nitride having an average particle diameter of 0.6$\mu$. The proportion of $\alpha$-type crystals in the product was 95%.

EXAMPLE 5

To 75 ml of ethanol, 21 g of ethyl silicate was added and then hydrolyzed by addition thereto of 7.2 ml of a 1% by weight aqueous triethylamine solution. A 17-ml portion of the modified silicic acid solution thus produced was used to impregnate 3 g of carbon black. The wet carbon black was vacuum dried at 50° C. The dried carbon black was treated with the same modified silicic acid solution two more times to produce the material for nitriding. This material was heated at 1480° C. for eight hours in an atmosphere of nitrogen, to give silicon nitride having an average particle diameter of 1.8$\mu$. The proportion of $\alpha$-type crystals in the product was 94%. The electron microscope photomicrograph of this silicon nitride is shown in the accompanying FIG. 1.

EXAMPLE 6

An aqueous solution of sodium metasilicate (concentration: 8% by weight of $SiO_2$) was passed through a column of an ion-exchange resin, "Amberlite" IRC-50 which had been treated in advance with a 5% by weight aqueous tetraethyl ammonium chloride solution, to produce a modified silicic acid solution. To 25 g of the modified silicic acid solution which had been adjusted in advance to 7% by weight of $SiO_2$ content, 1 g of carbon black was added. The mixture was treated in a homogenizer for 10 minutes and then spray dried to produce the material for nitriding. This material was heated at 1510° C. for four hours in an atmosphere of nitrogen, to give silicon nitride having an average particle diameter of 1.1μ. The proportion of α-type crystals in the product was 95%.

EXAMPLE 7

A dilute aqueous solution (concentration: 7.5% by weight of $SiO_2$) of water glass No. 3 (JIS K1408-66) was passed through a column of an ion-exchange resin, "Amberlite" IRC-50 which had been treated with a 7% by weight aqueous ammonia solution and washed with water, to produce a modified silicic acid solution. In a high-speed mixer, 7 g of the modified silicic acid solution (adjusted in advance to 7% by weight of $SiO_2$ content) and 50 g of a 2% aqueous hydroxyethyl cellulose solution added thereto were stirred thoroughly. The resultant mixture was freeze dried and then heated at 1450° C. for eight hours in an atmosphere of nitrogen, to give silicon nitride having an average particle diamter of 1.5μ. The presence of whiskers (crystal filaments) as well as particles was observed in the product. The proportion of α-type crystals in the product was 92%.

EXAMPLE 8

An aqueous solution of a mixture of ammonium alginate and silicic acid (concentrations: 3.5% by weight of ammonium alginate and 1.5% by weight of $SiO_2$) was prepared by using the same modified silicic acid solution as used in Example 7 and ammonium alginate.

By adding this aqueous solution to an aqueous solution of $HCl$-$NH_4Cl$ mixture solution (concentrations: 2% by weight of HCl and 10% by weight of $NH_4Cl$) which was kept vigorously stirred, there was obtained a finely divided precipitate. This precipitate was washed with water and then heated at 1500° C. for five hours in a current of $N_2$ gas to undergo a reaction. The resultant silicon nitride had an average particle diameter of 0.3μ. The proportion of α-type crystals in the product was 98%.

EXAMPLE 9

An aqueous solution of silicic acid-starch mixture (concentration: 3.1% by weight of $SiO_2$, $C/SiO_2$ (weight per weight) ratio: 0.7/1) was obtained by using the same silicic acid solution and soluble starch as involved in Example 1. This aqueous solution was spray dried, to give the material for nitriding.

This material was heated at 1510° C. for four hours in a current of nitrogen, to give silicon nitride having an average particle diameter of 0.4μ. The proportion of α-type crystals in the product was 94%.

EXAMPLE 10

The same aqueous solution of silicic acid-starch mixture as used in Example 9 was mixed with urea at a urea/$SiO_2$ (weight per weight) ratio of 0.05/1. The resultant mixture was spray dried and subjected to the same nitriding reaction as involved in Example 9. Consequently, there was obtained silicon nitride having an average particle diameter of 0.3μ. The dispersion of particle diameters was very small. The proportion of α-type crystals in the product was 95%.

EXAMPLES 11-12

The procedure of Example 9 was repeated, except that polyvinyl alcohol (Example 11) or casein (Example 12) was used in the place of the soluble starch, to produce the material for nitriding. This material was heated at 200° C. for eight hours in air and then heated at 1480° C. for five hours in a current of $N_2$. Consequently, there was obtained silicon nitride having an average particle diameter of 0.4μ. The proportion of α-type crystals in the product was 95% (Example 11) or 91% (Example 12).

EXAMPLE 13

A dilute aqueous solution obtained by adding 70 g of water to 103.5 g of water glass No. 3 (JIS K1408-66, concentration: 29.5% by weight of $SiO_2$) was neutralized by being added dropwise into 340 g of a 4.6% by weight aqueous HCl solution at 5° C. A 250-g portion of the resultant solution, 100 ml of isopropyl alcohol, and 70 g of NaCl were thoroughly shaken together, then allowed to stand. The isopropyl alcohol layer which consequently separated was collected and treated with an ion-exchange resin, "Amberlyst" 15 ($H^+$ form), to give an isopropyl alcohol solution of silicic acid (concentration: 8.8% by weight of $SiO_2$) ("Amberlyst" is a Registered Trade Mark).

A 14-ml portion of this solution was thoroughly mixed with 0.6 g of carbon black and then air-dried, to produce a silicic acid/carbon black mixture. This mixture was heated at 1510° C. for four hours in a current of $N_2$ gas. Consequently, there was obtained silicon nitride having an average particle diameter of 0.4μ. The proportion of α-type crystals in the product was 92%.

EXAMPLE 14

Sixty (60) g of dilute aqueous solution (concentration: 8% by weight of $SiO_2$) of water glass No. 3 (JIS K1408-66) was passed at a flow rate of 4.5 ml/min. through a column (glass column measuring 1 cm in diameter and 90 cm in length and provided with a cooling jacket) packed with 60 ml of a cation-exchange resin, "Amberlite" 200-C ($H^+$ form), for the removal of sodium. Consequently, there was obtained an aqueous silicic acid solution (concentration: 5% by weight of $SiO_2$).

Figure 2:
FIG. 2 is an electron microscope photomicrograph of silicon nitride whisker obtained by the other embodiment (Example 14) of the production method according to the present invention.

90 g of the aqueous silicic acid solution obtained above with 2 g of carbon black added thereto were treated for 15 minutes in a homogenizer. The homogenization product was freeze dried to produce a silicic acid/carbon black mixture. By heating 1 g of this mixture at 1510° C. for four hours in an atmosphere of nitrogen, there was obtained silicon nitride. An electron microscope photomicrograph of this silicon nitride is shown in the accompanying FIG. 2. Examination of this photograph shows that the product was in a whisker form. No silicon carbide and silicon oxynitride by-products were observed. The proportion of α-type crystals in the product was 93%.

EXAMPLE 15

A dilute aqueous solution obtained by adding 70 g of water to 50 g of water glass No. 3 (JIS K1408-66, concentration: 29.5% by weight of $SiO_2$) was passed through a column of an ion-exchange resin, "Amberlite" IRC-50, which had been treated in advance with a 5% by weight aqueous ammonia solution. Consequently, there was obtained a modified silicic acid solution. 12.5 g of the modified silicic acid solution (adjusted in advance to a $SiO_2$ content of 8% by weight) with 0.5 g of carbon black added thereto were stirred in a homogenizer. The resultant mixture was freeze dried in a freeze drying vessel, to produce the material for nitriding. The material was heated at 1510° C. for four hours in an atmosphere of nitrogen, to give silicon nitride. Observation of the product under an electron microscope revealed that the product was in a preponderantly whisker form. The proportion of α-type crystals in the product was 92%.

What is claimed is:

1. A method for the manufacture of silicon nitride having a particle diameter of at most 1.5 microns which comprises subjecting a homogeneous mixture of a liquid silicic acid or a modified liquid silicic acid with carbon in the form of powder or a solution to a heat treatment at a temperature of 1300° C. to 1600° C. in a non-oxidizing atmosphere containing nitrogen.

2. A method according to claim 1, wherein the liquid silicic acid is a solution or sol of silicic acid obtained by neutralization or dealkalinization of an aqueous alkali silicate solution.

3. A method according to claim 1, wherein the liquid silicic acid is a solution or sol of silicic acid obtained by hydrolysis of a hydrolyzable silicon compound.

4. A method according to claim 1, wherein the carbon in the form of powder is a carbon black or an activated carbon.

5. A method according to claim 2, wherein the carbon in the form of powder is a carbon black or activated carbon.

6. A method according to claim 1, wherein the precursor of carbon is a carbohydrate or a derivative thereof, a protein substance or a derivative thereof, a vinyl polymer or a derivative thereof, a thermosetting resin, or a petroleum pitch.

7. A method according to claim 2, wherein the precursor or carbon is a carbohydrate or a derivative thereof, a protein substance or a derivative thereof, a vinyl polymer or a derivative thereof, a thermosetting resin, or a petroleum pitch.

8. A method according to claim 1, wherein the precursor of carbon is starch or a hydrolyzate thereof, cellulose, hemi-cellulose, hydroxyethyl cellulose, arginic acid, pectin, natural gum, dextrin, dextran, sucrose, maltose, glucose, gluten, casein, polyvinyl alcohol, polyacrylonitrile, polyvinyl chloride, polyvinylidene chloride, polyvinyl acetate, polybutadiene, phenol resin, urea resin, or petroleum pitch.

9. A method accordiang to claim 1, wherein the precursor of carbon is starch, glucose, sucrose, alginic acid, casein, hydroxyethyl cellulose, or polyvinyl alcohol.

10. A method according to claim 1, wherein the precursor of carbon is a carbohydrate or a derivative thereof.

11. A method according to claim 1, wherein the precursor of carbon is starch or hydrolyzate thereof.

12. A method for the manufacture of silicon nitride having a particle diameter of at most 1.5 microns which comprises forming a homogeneous mixture of a liquid silicic acid or a modified liquid silicic acid with carbon in the form of a powder or a precursor of carbon in the form of powder or a solution, precipitating the mixture, and heat treating the precipitate at a temperature of 1300° C. to 1600° C. in a non-oxidizing atmosphere containing nitrogen.

13. A method for the manufacture of silicon nitride having a particle diameter of at most 1.5 microns which comprises forming a homogeneous mixture of a liquid silicic acid or a modified liquid silicic acid with carbon in the form of powder or a precursor of carbon in the form of powder or a solution, drying the mixture, and heat treating the dried mixture at a temperature of 1300° C. to 1600° C. in a non-oxidizing atmosphere containing nitrogen.

14. A method according to claim 13, wherein the drying is performed by spray-drying.

* * * * *